(12) United States Patent
Fischer

(10) Patent No.: US 7,801,298 B2
(45) Date of Patent: Sep. 21, 2010

(54) APPARATUS AND METHOD FOR DETECTING A POTENTIAL ATTACK ON A CRYPTOGRAPHIC CALCULATION

(75) Inventor: Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1309 days.

(21) Appl. No.: 11/313,241

(22) Filed: Dec. 20, 2005

(65) Prior Publication Data

US 2006/0159257 A1 Jul. 20, 2006

(30) Foreign Application Priority Data

Dec. 20, 2004 (DE) .................... 10 2004 061 312.5

(51) Int. Cl.
*H04L 9/28* (2006.01)
(52) U.S. Cl. .............................. 380/28; 380/29; 380/30; 726/22; 726/25; 713/171; 713/193
(58) Field of Classification Search ..................... 380/28
See application file for complete search history.

(56) References Cited

U.S. PATENT DOCUMENTS

| | | | | |
|---|---|---|---|---|
| 5,452,358 | A * | 9/1995 | Normile et al. ............... | 380/42 |
| 5,796,836 | A * | 8/1998 | Markham .................... | 380/28 |
| 6,278,783 | B1 * | 8/2001 | Kocher et al. ............... | 380/277 |
| 6,295,606 | B1 * | 9/2001 | Messerges et al. .......... | 713/189 |
| 6,456,963 | B1 * | 9/2002 | Araki ....................... | 704/200.1 |
| 6,694,436 | B1 * | 2/2004 | Audebert ...................... | 726/9 |
| 2001/0053220 | A1 * | 12/2001 | Kocher et al. ................. | 380/29 |
| 2002/0114451 | A1 * | 8/2002 | Satterfield ..................... | 380/37 |
| 2003/0044003 | A1 * | 3/2003 | Chari et al. .................... | 380/28 |
| 2004/0139136 | A1 * | 7/2004 | Goubin ....................... | 708/490 |
| 2004/0184604 | A1 * | 9/2004 | Joye et al. ..................... | 380/30 |
| 2006/0159257 | A1 * | 7/2006 | Fischer ......................... | 380/28 |
| 2007/0058800 | A1 * | 3/2007 | Neisse et al. .................. | 380/28 |

OTHER PUBLICATIONS

T. Messerges, "Securing the AES Finalists Against Power Analysis Attacks", 2000, pp. 150-164.*

Coron, et al.; "On Boolean and Arithmetic Masking against Differential Power Analysis"; Crytographic Hardware and Embedded Systems—CHES 2000, vol. 1965 of Lecture Notes in Computer Science, pp. 231-237, Springer-Verlag, 2000.

* cited by examiner

*Primary Examiner*—Kambiz Zand
*Assistant Examiner*—Yonas Bayou
(74) *Attorney, Agent, or Firm*—Dickstein, Shapiro, LLP.

(57) ABSTRACT

An apparatus for detecting a potential attack on a cryptographic calculation performing a calculation with at least one parameter includes first means for providing a parameter masked according to a first masking algorithm, first means for performing the calculation with the masked parameter in order to obtain a masked result of the calculation, means for remasking the masked result formed to process the masked result so that a remasked result masked according to a second masking algorithm is obtained, second means for providing a parameter masked according to the first masking algorithm, second means for performing the calculation with the provided masked parameter in order to obtain a second masked result, and means for examining the first remasked result and the second masked result in order to detect the potential attack.

27 Claims, 3 Drawing Sheets

US 7,801,298 B2

APPARATUS AND METHOD FOR DETECTING A POTENTIAL ATTACK ON A CRYPTOGRAPHIC CALCULATION

CROSS-REFERENCE TO RELATED APPLICATION

This application claims priority from German Patent Application No. 10 2004 061 312.5, which was filed on Dec. 20, 2004, and is incorporated herein by reference in its entirety.

BACKGROUND OF THE INVENTION

1. Field of the Invention

The present invention relates to the detection of cryptographic attacks on cryptographic calculation units, and particularly to detection of influencing the cryptographic units from outside within the scope of the cryptographic attack.

2. Description of the Related Art

Two of the best know attack scenarios on security devices are the differential power analysis (DPA) and fault attacks (FA). Every kind of these devices has to be capable of fending off these attacks.

In a DPA attack, information leading, for example, to a disclosure of the private key used by the cryptographic calculation is derived on the basis of a measurement of power consumed by a cryptographic device during a cryptographic calculation with predetermined attack parameters.

In order to thwart a DPA attack, different time delays may be implemented to change the processing patterns taken advantage of by a DPA attack, so that the characteristic features necessary for a disclosure of the private key do not occur in the power course.

Another possibility is to mask the cryptographic data, wherein the cryptographic data are combined with masking numbers, for example, such that power analysis does not lead to the desired success.

The fault attacks, however, are cryptographic attacks in which, for example, by outside effect on cryptographic chip, faults in the cryptographic calculation are brought about, which may lead to a disclosure of the private key.

Fault attacks may, for example, be fended off with sensor technology and special software. But the first only solves the problem symptomatically, since an influence, but not the effect, is recognized. The latter is only possible in special situations, for example in an RSA calculation, but not so much in the general execution of the code in the CPU.

DPA attacks may, for example, be fended off by generation of a balanced current profile, e.g. by dual rail with pre-charge in full custom, by generation of current or time noise, or by randomization of the process data. Again, the latter is only possible in special situations through the software, for example for the RSA calculation. The first, however, demands very intensive design, so that a semi-custom design is not yet possible, and does not necessarily guarantee success. Noise as masking parameter may complicate DPA analysis, but does not render it impossible.

SUMMARY OF THE INVENTION

It is an object of the present invention to provide a secure cryptographic defense concept.

In accordance with a first aspect, the present invention provides an apparatus for detecting a potential attack on a cryptographic calculation, which performs a calculation with at least one parameter, having: a first provider for providing a parameter masked according to a first masking algorithm; a first calculator for performing the calculation with the masked parameter in order to obtain a masked result of the calculation; a remasker for remasking the masked result, which is formed to process the masked result so that a remasked result masked according to a second masking algorithm is obtained; a second provider for providing a parameter masked according to the first masking algorithm; a second calculator for performing the calculation with the provided masked parameter in order to obtain a second masked result; and a result examiner for examining the remasked result and the second masked result in order to detect the potential attack.

In accordance with a second aspect, the present invention provides a cryptographic system with a calculating unit for performing a cryptographic calculation and a result register for providing a result of the cryptographic calculation, wherein the cryptographic calculation includes a calculation with at least one parameter and a cryptographic operation using a masked result of the calculation, and wherein the cryptographic system has: a first provider for providing a parameter masked according to a first masking algorithm; a first calculator for performing the calculation with the masked parameter in order to obtain a masked result of the calculation; a remasker for remasking the masked result, which is formed to process the masked result so that a remasked result masked according to a second masking algorithm is obtained; a second provider for providing a parameter masked according to the first masking algorithm; a second calculator for performing the calculation with the provided masked parameter in order to obtain a second masked result; wherein the first calculator is formed to provide the masked result by the calculation with the masked parameter; a processor for performing the cryptographic operation using the masked result; wherein the calculating unit is formed to file a result of the further cryptographic calculation into the result register, and to detect a potential attack during the cryptographic calculation by examining the remasked result and the second masked result; and wherein the calculating unit is formed to control the result register in case of a detected attack so that a register content of the result register is not output.

In accordance with a third aspect, the present invention provides a method of detecting a potential attack on a cryptographic calculation performing a calculation with at least one parameter, with the steps of: providing a parameter masked according to a first masking algorithm; performing the calculation with the masked parameter in order to obtain a first masked result of the calculation; remasking the first masked result in order to obtain a remasked result masked according to a second masking algorithm; providing a parameter masked according to the first masking algorithm; performing the calculation with the provided masked parameter in order to obtain a second masked result; and examining the remasked result and the second masked result in order to detect the attack.

In accordance with a fourth aspect, the present invention provides a method of performing a cryptographic operation using a calculating unit and a result register, in which a result of the cryptographic calculation is provided, wherein the cryptographic calculation includes a calculation with at least one parameter and a cryptographic operation using a masked result of the calculation, the method having the steps of: performing the calculation in order to obtain the masked result by the calculation with the masked parameter, with the steps of: providing a parameter masked according to a first masking algorithm; performing the calculation with the masked parameter in order to obtain a first masked result of the calculation; remasking the first masked result in order to obtain a remasked result masked according to a second masking algorithm; providing a parameter masked according to the first masking algorithm; performing the calculation with the provided masked parameter in order to obtain a second masked result; performing the cryptographic operation using the masked result; filing a result of the cryptographic operation into a result register; wherein a potential attack is detected by examining the remasked result and the second masked result; and controlling the result register of the calculating unit so that a register content of the result register is not output in the event of a detected attack.

In accordance with a fifth aspect, the present invention provides a computer program for performing, when the computer program is executed on a computer, the method of detecting a potential attack on a cryptographic calculation performing a calculation with at least one parameter, with the steps of: providing a parameter masked according to a first masking algorithm; performing the calculation with the masked parameter in order to obtain a first masked result of the calculation; remasking the first masked result in order to obtain a remasked result masked according to a second masking algorithm; providing a parameter masked according to the first masking algorithm; performing the calculation with the provided masked parameter in order to obtain a second masked result; and examining the remasked result and the second masked result in order to detect the attack.

In accordance with a sixth aspect, the present invention provides a computer program for performing, when the computer program is executed on a computer, the method of performing a cryptographic operation using a calculating unit and a result register, in which a result of the cryptographic calculation is provided, wherein the cryptographic calculation includes a calculation with at least one parameter and a cryptographic operation using a masked result of the calculation, the method having the steps of: performing the calculation in order to obtain the masked result by the calculation with the masked parameter, with the steps of: providing a parameter masked according to a first masking algorithm; performing the calculation with the masked parameter in order to obtain a first masked result of the calculation; remasking the first masked result in order to obtain a remasked result masked according to a second masking algorithm; providing a parameter masked according to the first masking algorithm; performing the calculation with the provided masked parameter in order to obtain a second masked result; performing the cryptographic operation using the masked result; filing a result of the cryptographic operation into a result register; wherein a potential attack is detected by examining the remasked result and the second masked result; and controlling the result register of the calculating unit so that a register content of the result register is not output in the event of a detected attack.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

The present invention is based on the finding that the DPA attack may be thwarted and the FA attack detected if cryptographic data, before being cryptographically processed, are masked with the aid of different masking parameters (DPA defense), wherein a masked result of the calculation of the masked data is processed further to detect a fault attack, which took place during the cryptographic calculation, for example.

According to the invention, the design of a DPA and FA-resistant ALU is enabled, which may be guaranteed even if semi-custom design, e.g. asynchronous design, is used as design method.

According to the invention, all additional delays lie outside the data path—it is at least possible to realize such an arrangement herewith, since the above-mentioned masked result, or the one in duplicate, can be processed outside the main data path.

Many attacks acting on the ALU are detected at the location at which they are relevant. In an attack, the cause, such as radiation or spike, is not of interest as long as it has no effect. This means that a working area of the chip does not have to be artificially restricted. Moreover, using the inventive approach, more stable design may be realized.

According to the present invention, since the fault attack is always detected using masked data or results, a plain text massage as input data, for example, is not required for this. Thereby, no additional cryptographic risk is brought about.

The invention further provides a concept with which DPA attacks can be fended off and fault attacks detected at the same time.

Figure 1:
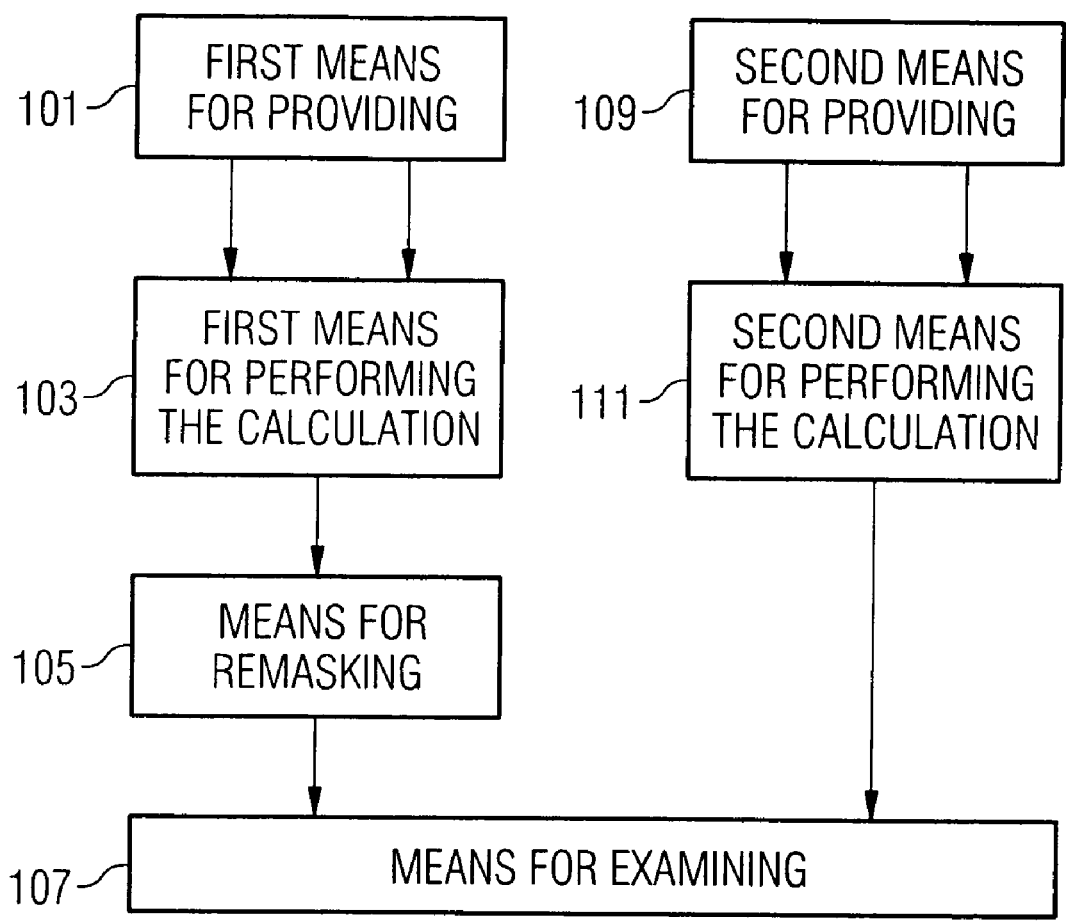
FIG. 1 is a block diagram of an apparatus for detecting a potential attack according to one embodiment.

FIG. 1 shows an apparatus for detecting a potential attack on a cryptographic calculation performing a calculation with at least one parameter, having first means 101 for providing a parameter masked according to a first masking algorithm, first means 103 for performing the calculation with the masked parameter to obtain a masked result of the calculation, means 105 for remasking the masked result, which is formed to process the masked result so that a remasked result is obtained, which is masked according to a second masking algorithm, second means 109 for providing a parameter masked according to the first masking algorithm, second means 111 for performing the calculation with the provided masked parameter to obtain a second masked result, and means 107 for examining the remasked result and the second masked result in order to detect the potential attack.

The calculation may for example include a negation of a parameter. Moreover, the calculation may include a calculation combination, for example, if a parameter (e.g. a number) is combined with a further parameter (e.g. a number).

The first means 101 for providing is formed, for example, to mask a parameter with a first masking parameter using the first masking algorithm to provide the masked parameter.

The apparatus illustrated in FIG. 1 may be formed to detect a potential attack on a cryptographic calculation performing a calculation combination of a first parameter with a second parameter. The apparatus includes the first means 101 for providing a first and a second parameter masked according to a first masking algorithm. First means 101 for providing comprises outputs connected to inputs of first means 103 for performing the calculation. In the embodiment illustrated in FIG. 1, first means 101 for providing includes two outputs, via which the masked first and second parameters are each output.

First means 103 for performing the calculation includes an output connected to means 105 for remasking. Means for remasking comprises an output connected to an input of means for examining.

The apparatus illustrated in FIG. 1 further includes the second means 109 for providing a first and a second parameter masked according to the first masking algorithm in order to obtain provided masked first and second parameters. Second means 109 for providing comprises outputs connected to inputs of second means 111 for performing the calculation. Second means 111 for performing the calculation comprises an output connected to a further input of means 107 for examining.

First means 101 is formed to provide a first and a second parameter masked according to a first masking algorithm. First means 103 is formed to receive the masked first and second parameters and to perform the calculation combination with the masked first and second parameters in order to obtain a first masked result of the calculation.

Second means 109 is formed to provide the first and second parameters masked according to the first masking algorithm. The provided masked first parameter and the provided masked second parameter are made available to the second means 111, which is formed to perform the calculation combination with the provided masked first and second parameters in order to obtain a second masked result.

The second masked result is supplied to means 107 for examining.

The first masked result of the calculation is supplied to means 105 for remasking, which is formed to process the first masked result so that a remasked result is obtained, which is masked according to a second masking algorithm.

The remasked result is supplied to means 107 for examining. Means 107 for examining is formed to examine the remasked result and the second masked result to detect the attack.

First means 103 and second means 111 for performing the calculation may be separate from each other. According to a further aspect, first and second means for performing the calculation may, however, be included by means formed to perform the calculation combination of the masked first and second parameters provided by first means 101, as well as the calculation combination of the provided masked first and second parameters provided by second means 109 for providing.

According to a further aspect, first means 101 for providing is formed to mask a first parameter with a first masking parameter using the first masking algorithm in order to provide the masked first parameter, and to mask a second parameter with a second masking parameter using the first masking algorithm in order to provide the masked second parameter. The first and second masking parameters may be random numbers, for example.

The first masking algorithm may for example include a first masking combination. In this case, first means 101 for providing may be formed to perform the first masking combination in order to combine the first parameter with the first masking parameter, and to combine the second parameter with the second masking parameter, wherein the first masking combination and the calculation combination are based on the same combination type.

The combination type may, for example, be an arithmetic combination type including, for example, the following arithmetic operations: addition, subtraction, multiplication, and division. In this case, the calculation combination and the first masking combination are arithmetic combinations, for example additions. The first masking combination and the calculation combination may include the same combination operations. According to a further aspect, however, it is also possible that the first masking combination and the calculation combination may comprise different arithmetic operations. For example, the first masking combination may include a subtraction, whereas the calculation combination includes an addition.

The combination type may, however, also be a Boolean combination type, i.e. a logical combination type. In this case, the first masking combination and the calculation combination are a logic combination, which may include the following logical operations: "or", "nor", "xor", "and", as well as "nand". The logical operations included by the calculation combination and by the first masking combination may be the same or different. If the first masking combination, for example, includes "xor" or "xnor", the calculation combination may for example include "and" or "nand", respectively.

Depending on the combination type underlying the calculation (the calculation combination), first means 103 for performing the calculation as well as second means 111 for performing the calculation may be formed to perform either an arithmetic or a logical combination. Depending on the combination type performed by first means 103 for performing the calculation, first means 101 for providing may be formed to perform either an arithmetic or a logical combination. In other words, first means 101 for providing is formed to mask the parameters arithmetically (arithmetic mask) if first means 103 for performing the calculation is formed to perform an arithmetic combination. Analogously, first means 101 for providing may be formed to mask the parameters with the aid of a logical combination (logical mask) if first means 103 is formed to perform a logical combination.

For example, first means 101 for providing is formed to add the first parameter and the first masking parameter, and to add the second parameter and the second masking parameter, in order to create a logical mask.

According to a further aspect, first means 101 for providing may be formed to combine the first parameter with the first masking parameter and the second parameter with the second masking parameter by a logical combination, for example by "xor"-ing or by "xnor"-ing. In this case, first means 103 for performing may be formed to combine the first parameter with the masked second parameter by "and"-ing or by "nand"-ing in order to obtain the first masked result, which comprises a logical mask.

The calculation performed by first means 103 for performing the calculation may, for example, be a calculation performed within the cryptographic calculation. The masking serves to prevent a successful DPA attack, for example. This takes place by masking the first and the second parameter using the first masking algorithm. The result output by first means 103 for performing the calculation may, for example, be tapped off in order to be used within the scope of the further cryptographic calculation. The other means illustrated in FIG. 1 may, for example, be used to detect a fault attack.

Second means 109 for providing is formed to mask the first parameter with a third masking parameter using the second masking algorithm in order to obtain a masked first intermediate parameter, and to mask the first parameter with a fourth masking parameter using the second masking algorithm in order to obtain a masked second intermediate parameter.

Preferably, the second masking algorithm differs from the first masking algorithm in that manipulation of the data is detectable in every case. For example, if the second masking algorithm includes a second masking combination, the first masking combination used by the first masking algorithm and the second masking combination used by the second masking algorithm differ in the combination type, for example. If the first masking combination, for example, includes an arithmetic combination, then the second masking combination, for example, includes a logical combination, and vice versa. Thus, it can be guaranteed that, even in the event a successful attack on the arithmetic masking combination, the attack may be detected on the basis of the logical combination, or vice versa.

In other words, the second masking combination is a logical combination if the first masking combination is an arithmetic combination. Correspondingly, the second masking combination is an arithmetic combination if the first masking combination is a logical combination.

For example, the second masking combination includes "xor"-ing or "xnor"-ing if the first masking combination includes an addition of a subtraction. Correspondingly, the second masking combination, for example, includes an addition or a subtraction if the first masking combination includes "xnor"-ing or "xor"-ing.

In other words, the first and the second parameter are masked using the second masking algorithm in order to create a logical mask, for example, if the first masking algorithm creates an arithmetic mask, or in order to create an arithmetic mask, for example, if the first masking algorithm creates a logical mask.

According to a further embodiment, second means 109 for providing may include means for remasking formed to remask the masked first intermediate parameter in order to obtain the provided masked first parameter, and to remask the masked second intermediate parameter in order to obtain the provided masked second parameter.

Means for remasking included by second means for providing may, for example, be formed to replace a logical mask by an arithmetic mask.

For example, means for remasking included by second means 109 for providing is formed to remask the masked first parameters using a further masking parameter differing from the third masking parameter in order to obtain the provided masked first parameter, and to remask the masked second intermediate parameter using a further masking parameter differing from the fourth masking parameter in order to obtain the provided masked second parameter.

In other words, means for remasking is formed to remask the result of the calculation using new masking parameters, which have not yet been used, in order to replace a logical mask by an arithmetic one, for example.

According to a further aspect, means for remasking may be formed to remask the first masked intermediate parameter and the masked second intermediate parameter using further masking parameters so that the provided masked first parameter and the provided masked second parameter each represent an arithmetic combination with a further masking parameter if second means 111 for performing the calculation is formed to perform an arithmetic combination, or remask them so that the provided masked first parameter and the provided masked second parameter each represent a logical combination with a further masking parameter if second means 111 for performing the calculation is formed to perform a logical combination. Means 105 for remasking comprises the same properties, for example.

Means 105 for remasking may be formed to remask the masked result using a further masking parameter different from the first and the second masking parameter so that the remasked result represents an arithmetic combination of the first parameter, the second parameter and the further masking parameter if means 103 for performing the calculation is formed to perform a logical combination, or to remask them so that the remasked result represents a logical combination of the first parameter, the second parameter and the further masking parameter if means 103 for performing the calculation is formed to perform an arithmetic combination.

For example, means 107 for examining is formed to de-mask the first masked result supplied from means 105 for remasking taking the first masking algorithm into account in order to obtain a first combination of the first and second parameters, to de-mask the second masking result supplied from second means 111 for performing the calculation taking the second masking algorithm into account in order to obtain a second combination of the first and second parameters, and to compare the first combination with the second combination in order to detect an attack in case of a difference between the first combination and the second combination.

For example, the first combination and the second combination are the same combinations (calculation combinations), i.e. an addition or "xor"-ing, for example, wherein the respective combination has each come about on the basis of a different calculation using different combinations and maskings. In the de-masking, for example, a resulting mask resulting when two masked parameters are combined with each other, for example, is removed. For example, if the combination is an arithmetic combination, the common masking can be removed by subtraction in order to obtain the respective combination.

In the comparison, means 107 for examining may for example make a subtraction between the first and the second combination in order to capture a difference.

The inventive apparatus is preferably implemented with the aid of calculating units and registers. For example, first means 101 for providing may include a first register for providing the masked first parameter and a second register for providing the masked second parameter. In this case, means 103 for performing the calculation may be formed to read out a first register content of the first register and a second register content of the second register, and to combine the first register content with the second register content in order to obtain the first masked result, and to file the first masked result into an intermediate register.

For example, means 105 for remasking is formed to process and, for example, change a content of the intermediate register so that means 107 for examining can read out a content of the intermediate register in order to detect the attack.

By analogy, second means 109 for providing may be formed to file the provided masked first parameter into a third register, and to file the provided masked second parameter into a fourth register. Second means 111 for performing the calculation may then be formed, for example, to read out a register content of the third register and a register content of the fourth register, and to file the second masked result into a further result register, so that means 107 for examining can read out the second masked result from the further result register.

As already mentioned, the calculation may be an operation within a cryptographic calculation. In this case, the parameters, for example the first or the second parameter or the first masked result, may be plain text data, encryption data, signature data, or key data.

The calculation combinations performed by the apparatus may generally, in the case of arithmetic-type combinations, be additions, subtractions, divisions and multiplications. By analogy, the logic-type combinations may be "xor"-ing, "or"-ing, "xnor"-ing, "nor"-ing, "and"-ing, or "nand"-ing.

Figure 2:
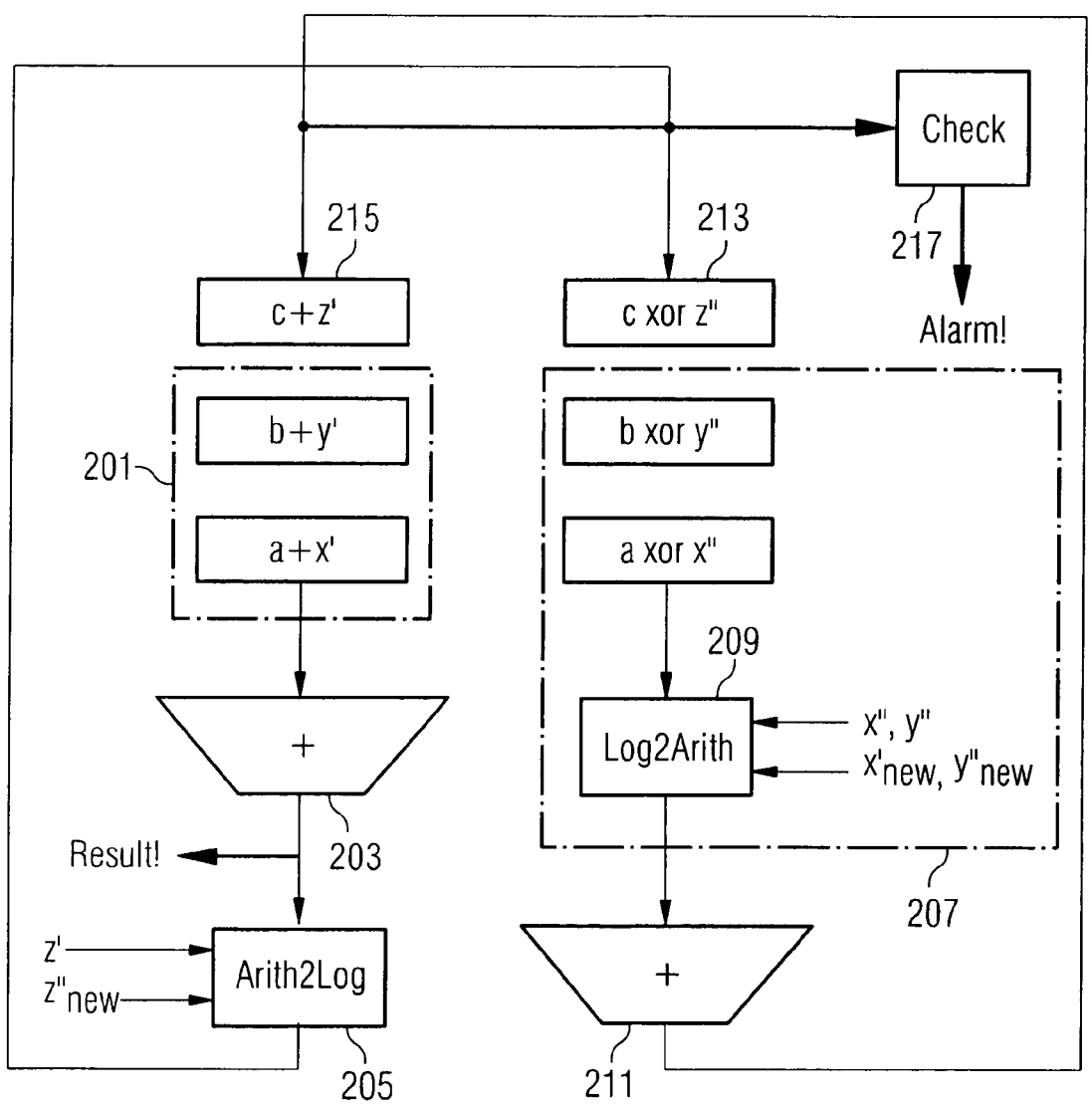
FIG. 2 is a block diagram of an apparatus for detecting a potential attack according to a further embodiment.

FIG. 2 shows a block diagram of an apparatus for detecting a potential attack according to a further embodiment of the invention.

The apparatus includes means 201 for providing a first parameter b+y' and a second parameter a+x' masked according to a first masking algorithm. The numbers x' and y' are a first and a second masking parameter, respectively.

Means 201 for providing includes two separate registers in which the masked first and second parameters are filed.

Means 203 for performing the calculation connected to means 201 for providing is formed to combine the masked first and second parameters with each other, for example using an arithmetic addition operation, in order to obtain a first masked result of the calculation, wherein the result may be provided for a further cryptographic calculation.

The apparatus further includes means 205 for remasking formed to replace the arithmetic masking by a logical masking.

The apparatus further includes second means 207 for providing a provided masked first parameter b xor y" and a provided masked second parameter a xor x". As mentioned in FIG. 2, second means 207 for providing includes two registers into which the provided masked parameters may be filed.

Second means 207 for providing further includes means 209 for remasking formed to replace a logical masking by an arithmetic masking.

An output of means 209 for remasking is connected to means 211 for performing the calculation. Means 211 for performing the calculation is preferably formed to perform the same combination type performed by means 203 for performing the calculation.

The apparatus further includes a result register 213 coupled to an output of means 205 for remasking, wherein the remasked result c xor z" is filed in the register 213.

The apparatus further includes a further result register 215 coupled to an output of means 211 for performing the calculation.

The apparatus further includes means 217 for examining the first remasked result and the second remasked result, which is filed in the further result register, in order to detect the potential attack. If an attack has been detected, means 217 for examining is formed to output an alarm signal.

Figure 3:
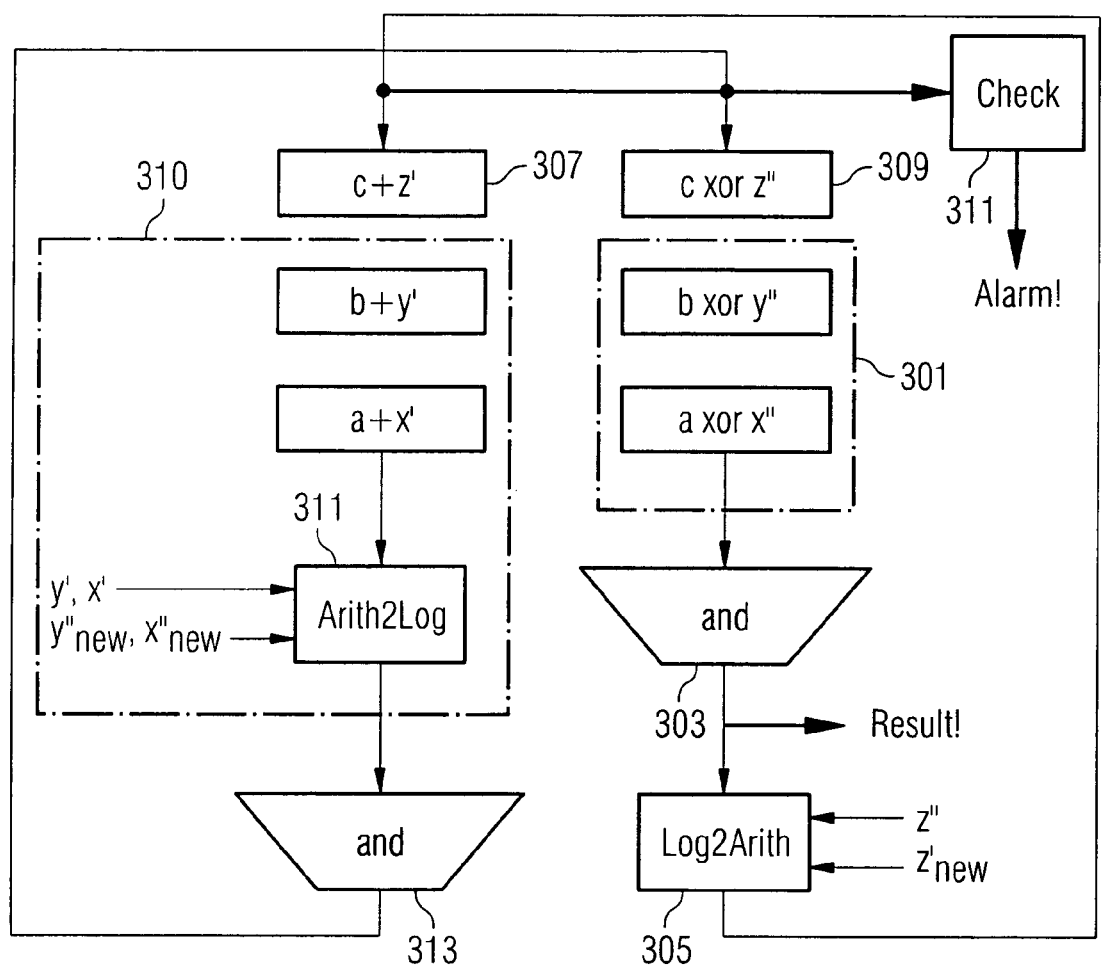
FIG. 3 is a block diagram of an apparatus for detecting a potential attack according to a further embodiment.

FIG. 3 shows a further embodiment of an apparatus for detecting a potential attack. The apparatus includes first means 301 for providing coupled to means 303 for performing the calculation. As shown in FIG. 3, means 303 for performing the calculation is formed to perform "and"-ing. For this, the masking parameters x" and y" may be used.

First means 303 for performing the calculation is coupled to means 305 for remasking, wherein means 305 for remasking is formed to replace a logical mask by an arithmetic mask. Means 305 for remasking comprises an output with which a result register 307 is coupled.

The apparatus further includes second means 309 for providing comprising, apart from the result registers in which the provided masked parameters b+y' and a+x' are filed, means 311 for remasking. Means 311 for remasking is formed to replace the arithmetic mask by a logical mask, wherein further masking parameters are used.

Means 311 for remasking is coupled to second means 313 for performing the calculation. Means 313 for performing the calculation comprises an output coupled to a further result register 309. The apparatus further includes means 311 for examining coupled to the inputs of the result registers.

In the following, the inventive concept will be explained at the example of an addition of two numbers a and b in order to obtain c=a+b, with reference to FIG. 1.

Both data are masked, each with an arithmetic mask x', y' and a logical mask x", y". The result will be masked with the corresponding masks z' and z". There will be redundancy in the calculation, which may be used for error detection.

Due to c+x'+y'=(a+x')+(b+y'), the arithmetically masked data are used and simply added, so that the result is automatically masked with z'=x'+y'. This result is present exactly after the time also required for conventional addition. It could, if necessary, be processed further immediately (e.g. jump address). Before the datum is stored, it is, however, remasked, so that it is given a logical mask. Consequently, the result is then filed on the "logical side".

On the other hand, the logically masked data (a xor x") and (b xor y') are first remasked, so that it will be given arithmetic data (e.g. a+x1' and b+y1', with new masks), only then are they added—again with a normal adder. In the write-back stage, the result is written back into the arithmetic side. The two results represent the same mathematical datum. Thus, it may now be checked whether an error has occurred in the execution of the calculation.

By this procedure, the following is guaranteed:

the result itself is present after minimum execution time;

multiplexing the HW is possible by the alternating execution of the two steps "remasking" and "adding";

the error recognition is taken out of the critical path (it is indeed sufficient for an error to be recognized a few clocks later);

even if double the register number is required as compared with a conventional architecture (but only for internal registers!), the HW (hardware) for the error check is less intensive than for e.g. Hamming code checkers;

the entire calculation executes in fully randomized manner!

In contrast hereto, in the embodiment illustrated in FIG. 3, ANDing of second data (a AND b) is performed.

According to a further aspect, the following invention provides a cryptographic system with a calculating unit for performing a cryptographic calculation and a result register for providing a result of the cryptographic calculation, wherein the cryptographic calculation includes a calculation combination of two masked parameters and a cryptographic operation using a masked result of the calculation, and wherein the cryptographic system comprises the above-described apparatus, wherein first means for performing the calculation is formed to provide the masked result by the calculation combination of the masked first parameter with the masked second parameter, means for performing the cryptographic operation using the masked result in order to obtain the result, wherein the calculating unit is formed to file the result into the result register, and wherein the apparatus for detecting is formed to detect a potential attack during the cryptographic calculation, and wherein the calculating unit is formed to control the result register in case of a detected attack so that a register content of the result register is not passed on. The content of the register is deleted, for example.

Depending on conditions, the inventive method may be implemented in hardware or in software. The implementation may be on a digital storage medium, particularly a floppy disk or a CD with electronically readable control signals capable of interacting with a programmable computer system, so that the corresponding method is executed. In general, the invention thus consists in a computer program product with a program code stored on a machine-readable carrier for performing the inventive method, when the computer program product is executed on a computer. In other words, the invention may thus be realized as a computer program with a program code for performing the inventive method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for detecting a potential attack on a cryptographic calculation, which performs a calculation with at least one parameter, comprising:
   a first provider formed to provide a parameter masked according to a first masking algorithm;
   a first calculator formed to perform the calculation with the masked parameter in order to obtain a first masked result of the calculation;
   a remasker formed to remask the first masked result, which is formed to process the first masked result so that a remasked result masked according to a second masking algorithm is obtained;
   a second provider formed to provide a parameter masked according to the first masking algorithm;
   a second calculator formed to perform the calculation with the provided masked parameter in order to obtain a second masked result; and
   a result examiner formed to examine the remasked result and the second masked result in order to detect the potential attack.

2. The apparatus of claim 1, wherein the first provider is formed to mask a parameter with a first masking parameter using the first masking algorithm in order to provide the masked parameter.

3. The apparatus of claim 1, wherein the cryptographic calculation is formed to perform a calculation combination of a first and a second parameter, wherein the first provider is formed to provide first and second parameters masked according to the first masking algorithm, wherein the first calculator is formed to perform the calculation combination with the masked first and second parameters in order to obtain the first masked result of the calculation, wherein the second provider is formed to provide first and second parameters masked according to the first masking algorithm, wherein the second calculator is formed to perform the calculation combination with the provided first and second parameters in order to obtain the second masked result.

4. The apparatus of claim 3, wherein the first provider is formed to mask the first parameter with a first masking parameter using the first masking algorithm in order to provide the masked first parameter, and to mask the second parameter with a second masking parameter using the first masking algorithm in order to provide the masked second parameter.

5. The apparatus of claim 3, wherein the first masking algorithm includes a first masking combination, wherein the first provider is formed to perform the first masking combination in order to combine the first parameter with the first masking parameter and to combine the second parameter with the second masking parameter, wherein the first masking combination and the calculation combination are based on the same combination type.

6. The apparatus of claim 5, wherein the combination type is an arithmetic combination type or a logical combination type.

7. The apparatus of claim 3, wherein the first provider is formed to combine the first parameter with the first masking parameter arithmetically, to combine the second masking parameter with the second parameter arithmetically, and wherein the first calculator is formed to combine the masked first parameter with the masked second parameter arithmetically in order to obtain the first masked result.

8. The apparatus of claim 7, wherein the first provider is formed to add the first parameter and the first masking parameter, and to add the second parameter and the second masking parameter.

9. The apparatus of claim 3, wherein the first provider is formed to combine the first parameter with the first masking parameter logically, to combine the second parameter with the second masking parameter logically, and wherein the first calculator is formed to combine the masked first parameter with the masked second parameter logically in order to obtain the first masked result.

10. The apparatus of claim 9, wherein the first provider is formed to "xor" or "xnor" the first parameter with the first masking parameter and the second parameter with the second masking parameter, and wherein the first calculator is formed to "and" or "nand" the masked first parameter with the masked second parameter in order to obtain the first masked result.

11. The apparatus of claim 3, wherein the second provider is formed to mask the first parameter with a third masking parameter using the second masking algorithm in order to obtain a masked first intermediate parameter, and to mask the second parameter with a fourth masking parameter using the second masking algorithm in order to obtain a masked second intermediate parameter.

12. The apparatus of claim 11, wherein the first masking algorithm includes a first masking combination, and the first provider is formed to perform the first masking combination in order to combine the first parameter with the first masking parameter, and
   wherein the second masking algorithm includes a second masking combination, and the second provider is formed to perform the second masking combination, to combine the first parameter with the third masking parameter, and to combine the second parameter with the fourth masking parameter,
   wherein the second masking combination is a logical combination if the first masking combination is an arithmetic combination, and wherein the second masking combination is an arithmetic combination if the first masking combination is a logical combination.

13. The apparatus of claim 12, wherein the second masking combination includes "xor"-ing or "xnor"-ing if the first masking combination includes an addition or a subtraction, or wherein the second masking combination includes an addition or a subtraction if the first masking combination includes "xor"-ing or "xnor"-ing.

14. The apparatus of claim 11, wherein the second provider includes a remasker, wherein the remasker is formed to remask the masked first intermediate parameter in order to obtain the provided masked first parameter, and to remask the masked second intermediate parameter in order to obtain the provided masked second parameter.

15. The apparatus of claim 14, wherein the remasker included in the second provider is formed to remask the masked first intermediate parameter using a further masking parameter differing from the third masking parameter in order to obtain the provided masked first parameter, and to remask the masked second intermediate parameter using a further masking parameter differing from the fourth masking parameter in order to obtain the provided masked second parameter.

16. The apparatus of claim 13, wherein the remasker is formed to remask the masked first intermediate parameter and the masked second intermediate parameter using further masking parameters so that the provided masked first parameter and the provided masked second parameter each represent an arithmetic combination with a further masking parameter if the second calculator is formed to perform an arithmetic combination, or remask them so that the provided masked first parameter and the provided masked second parameter each represent a logical combination with a further masking parameter if the second calculator is formed to perform a logical combination.

17. The apparatus of claim 3, wherein the remasker is formed to remask the first masked result using a further masking parameter so that the remasked result represents an arithmetic combination of the first parameter, the second parameter, and the further masking parameter if the first calculator is formed to perform a logical combination, or remask them so that the remasked result represents a logical combination of the first parameter, the second parameter, and the further masking parameter if the first calculator is formed to perform an arithmetic combination.

18. The apparatus of claim 1, wherein the result examiner is formed to de-mask the first masked result taking the first masking algorithm into account in order to obtain a first combination of the first and the second parameter, and to de-mask the second masked result taking the second masking algorithm into account in order to obtain a second combination of the first and the second parameter, and to compare the first combination with the second combination in order to detect an attack in case of a difference between the first combination and the second combination.

19. The apparatus of claim 18, wherein the first provider includes a first register for providing the masked first parameter and a second register for providing the masked second parameter, and wherein the first calculator is formed to read out a first register content of the first register and a second register content of the second register, and to combine the first register content with the second register content in order to obtain the first masked result, and to file the first masked result into an intermediate register, wherein the remasker is formed to process a content of the intermediate register, and wherein the result examiner is formed to read out a content of the intermediate register.

20. The apparatus of claim 1, wherein the second provider is formed to file the provided masked first parameter into a third register, and to file the provided masked second parameter into a fourth register, wherein the second calculator is formed to read out a register content of the third register and a register content of the fourth register, and to file the second masked result into a further result register, wherein the result examiner is formed to read out the second masked result from the further result register.

21. The apparatus of claim 1, wherein the calculation is an operation within a cryptographic calculation, and the first or the second parameter or the first masked result is plain text data, encryption data, signature data, or key data.

22. The apparatus of claim 1, wherein the calculation is a logical combination, including "xor"-ing, "xnor"-ing, "or"-ing, "nor"-ing, "and"-ing, or "nand"-ing, or wherein the calculation is an arithmetic combination, including an addition, a subtraction, a division, or a multiplication.

23. A cryptographic system with a calculating unit for performing a cryptographic calculation and a result register for providing a result of the cryptographic calculation, wherein the cryptographic calculation includes a calculation with at least one parameter and a cryptographic operation using a masked result of the calculation, and wherein the cryptographic system includes:
a first provider formed to provide a parameter masked according to a first masking algorithm;
a first calculator formed to perform the calculation with the first masked parameter in order to obtain a masked result of the calculation;
a remasker formed to remask the first masked result, which is formed to process the first masked result so that a remasked result masked according to a second masking algorithm is obtained;
a second provider formed to provide a parameter masked according to the first masking algorithm;
a second calculator formed to perform the calculation with the provided masked parameter in order to obtain a second masked result;
wherein the first calculator is formed to provide the first masked result by the calculation with the masked parameter; and
a processor formed to perform the cryptographic operation using the masked result;
wherein the calculating unit is formed to file a result of the further cryptographic calculation into the result register, and to detect a potential attack during the cryptographic calculation by examining the remasked result and the second masked result, and
wherein the calculating unit is formed to control the result register in case of a detected attack so that a register content of the result register is not output.

24. A method of detecting a potential attack on a cryptographic calculation performing a calculation with at least one parameter, the method comprising:
providing a parameter masked according to a first masking algorithm;
performing the calculation with the masked parameter in order to obtain a first masked result of the calculation;
remasking the first masked result in order to obtain a remasked result masked according to a second masking algorithm;
providing a parameter masked according to the first masking algorithm;
performing the calculation with the provided masked parameter in order to obtain a second masked result; and
examining the remasked result and the second masked result in order to detect the attack,
wherein the method is performed by a computer processor.

25. A method of performing a cryptographic operation using a calculating unit and a result register, in which a result of the cryptographic calculation is provided, wherein the cryptographic calculation includes a calculation with at least one parameter and a cryptographic operation using a masked result of the calculation, the method including the steps of:
performing the calculation in order to obtain the masked result by the calculation with the masked parameter, the method comprising:
providing a parameter masked according to a first masking algorithm;
performing the calculation with the masked parameter in order to obtain a first masked result of the calculation;
remasking the first masked result in order to obtain a remasked result masked according to a second masking algorithm;
providing a parameter masked according to the first masking algorithm; and performing the calculation with the provided masked parameter in order to obtain a second masked result;

performing the cryptographic operation using the masked result;

filing a result of the cryptographic operation into a result register, wherein a potential attack is detected by examining the remasked result and the second masked result; and controlling the result register of the calculating unit so that a register content of the result register is not output in the event of a detected attack, wherein the method is performed by a computer processor.

26. A computer program for performing, when the computer program is executed on a computer, the method of detecting a potential attack on a cryptographic calculation performing a calculation with at least one parameter, the method comprising:

providing a parameter masked according to a first masking algorithm;

performing the calculation with the masked parameter in order to obtain a first masked result of the calculation;

remasking the first masked result in order to obtain a remasked result masked according to a second masking algorithm;

providing a parameter masked according to the first masking algorithm;

performing the calculation with the provided masked parameter in order to obtain a second masked result; and examining the remasked result and the second masked result in order to detect the attack.

27. A computer program for performing, when the computer program is executed on a computer, the method of performing a cryptographic operation using a calculating unit and a result register, in which a result of the cryptographic calculation is provided, wherein the cryptographic calculation includes a calculation with at least one parameter and a cryptographic operation using a masked result of the calculation, the method comprising:

performing the calculation in order to obtain the masked result by the calculation with the masked parameter, with the steps of:

providing a parameter masked according to a first masking algorithm;

performing the calculation with the masked parameter in order to obtain a first masked result of the calculation;

remasking the first masked result in order to obtain a remasked result masked according to a second masking algorithm;

providing a parameter masked according to the first masking algorithm; and performing the calculation with the provided masked parameter in order to obtain a second masked result;

performing the cryptographic operation using the masked result;

filing a result of the cryptographic operation into a result register, wherein a potential attack is detected by examining the remasked result and the second masked result; and controlling the result register of the calculating unit so that a register content of the result register is not output in the event of a detected attack.

* * * * *